(12) United States Patent
Nicholson

(10) Patent No.: US 12,255,534 B2
(45) Date of Patent: Mar. 18, 2025

(54) SYSTEMS AND METHODS FOR STABLE INTERMEDIATE NODE OPERATION IN SERIES STACKED PHASE DC-DC CONVERTERS

(71) Applicant: Empower Semiconductor, Inc., San Jose, CA (US)

(72) Inventor: Richard Nicholson, Aptos, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 177 days.

(21) Appl. No.: 18/066,893

(22) Filed: Dec. 15, 2022

(65) Prior Publication Data

US 2023/0198390 A1 Jun. 22, 2023

Related U.S. Application Data

(60) Provisional application No. 63/265,823, filed on Dec. 21, 2021, provisional application No. 63/265,611, filed on Dec. 17, 2021.

(51) Int. Cl.
*H02M 3/158* (2006.01)
*H02M 1/00* (2007.01)

(52) U.S. Cl.
CPC ......... *H02M 3/158* (2013.01); *H02M 1/0074* (2021.05); *H02M 1/0009* (2021.05); *H02M 3/1582* (2013.01); *H02M 3/1584* (2013.01)

(58) Field of Classification Search
CPC ... H02M 1/0074; H02M 3/158; H02M 3/1584
See application file for complete search history.

(56) References Cited

U.S. PATENT DOCUMENTS

| 10,284,092 B1 | 5/2019 | Elsayad et al. |
| 10,651,735 B2 | 5/2020 | Dai |
| 10,770,893 B2 | 9/2020 | Lehn et al. |
| 11,469,675 B1 * | 10/2022 | Safa .................. H02M 3/1584 |

(Continued)

FOREIGN PATENT DOCUMENTS

| TW | 201644164 A | 12/2016 |
| TW | 202135451 A | 9/2021 |
| WO | 2020171886 A1 | 8/2020 |

OTHER PUBLICATIONS

Office Action in TW111148332, mailed Jan. 9, 2024, 5 pages.

*Primary Examiner* — Jue Zhang
(74) *Attorney, Agent, or Firm* — FisherBroyles, LLP

(57) ABSTRACT

A power converter circuit. In one aspect, the power converter circuit includes a first buck converter coupled in series to a second buck converter at a junction, and a control circuit coupled to each of the first and second buck converters. In another aspect, the control circuit is arranged to continuously operate the first buck converter, sense a voltage at the junction, compare the sensed voltage to a first threshold voltage and in response to the sensed voltage being at a voltage lower than the first threshold voltage disables the second buck converter. In yet another aspect, the control circuit is arranged to continuously operate the first buck converter, compare the sensed voltage to a second threshold voltage and in response to the sensed voltage being at a voltage higher than the second threshold voltage, the control circuit operates the second buck converter.

20 Claims, 2 Drawing Sheets

(56) References Cited

U.S. PATENT DOCUMENTS

| | | | |
|---|---|---|---|
| 2012/0007431 A1* | 1/2012 | Jang | H02J 4/00 307/82 |
| 2013/0094157 A1 | 4/2013 | Giuliano | |
| 2016/0268898 A1* | 9/2016 | Deboy | H02M 3/158 |
| 2021/0226546 A1 | 7/2021 | Low | |

* cited by examiner

SYSTEMS AND METHODS FOR STABLE INTERMEDIATE NODE OPERATION IN SERIES STACKED PHASE DC-DC CONVERTERS

CROSS REFERENCE TO RELATED APPLICATIONS

This application claims priority to the following commonly-assigned U.S. provisional patent applications: Ser. No. 63/265,611, for "SYSTEMS AND METHODS FOR STABLE INTERMEDIATE NODE OPERATION IN SERIES STACKED PHASE DC-DC CONVERTERS" filed on Dec. 17, 2021, and Ser. No. 63/265,823, for "PHASE MULTIPLEXED SERIES STACKED DC-DC CONVERTER" filed on Dec. 21, 2021, which are hereby incorporated by reference in entirety for all purposes. This application is also related to the following concurrently-filed and commonly-assigned U.S. patent application Ser. No. 18/066,911, entitled "PHASE MULTIPLEXED SERIES STACKED DC-DC CONVERTER," filed Dec. 15, 2022, which is also hereby incorporated by reference in its entirety for all purposes.

FIELD

The described embodiments relate generally to power converters, and more particularly, the present embodiments relate to system and methods for stable intermediate node operation in series stacked phase DC-DC converter circuits.

BACKGROUND

A wide variety of electronic devices are available for consumers today. Many of these devices have integrated circuits that are powered by regulated low voltage DC power sources. These low voltage power sources are often generated by dedicated power converter circuits that use a higher voltage input from a battery or another power source. In some applications, the dedicated power converter circuit can be one of the largest power dissipating components of the electronic device and can sometimes consume more space than the integrated circuit that it powers. As electronic devices become more sophisticated and more compact, more efficient power converter circuits are called for.

SUMMARY

In some embodiments, a power converter circuit is disclosed. The power converter circuit includes a first buck converter having a first switch having a first gate terminal, a first drain terminal and a first source terminal, and a second switch having a second gate terminal, a second drain terminal and a second source terminal, the first source terminal coupled to the second drain terminal at a first switch node; a second buck converter having a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal; an input terminal coupled to the first drain terminal; an output terminal coupled to the first and second switch nodes; and a control circuit coupled to each of the first and second buck converters, and arranged to continuously operate the first buck converter, wherein the control circuit is further arranged to: sense a voltage at the junction; compare the sensed voltage to a first threshold voltage and in response to the sensed voltage at a voltage lower than the first threshold voltage, the control circuit disables the second buck converter; and compare the sensed voltage to a second threshold voltage and in response to the sensed voltage at a voltage higher than the second threshold voltage, the control circuit operates the second buck converter.

In some embodiments, the first and second buck converters are arranged to generate an output voltage at the output terminal that is lower that an input voltage at the input terminal.

In some embodiments, the first and second buck converters are arranged to control power transfer from the input terminal to the output terminal.

In some embodiments, the control circuit includes a window comparator that includes a first comparator and a second comparator.

In some embodiments, the first comparator is arranged to receive the voltage at the junction and to receive the first threshold voltage.

In some embodiments, the second comparator is arranged to receive the voltage at the junction and to receive the second threshold voltage.

In some embodiments, the output terminal is coupled to the first switch node through a first inductor.

In some embodiments, the output terminal is coupled to the second switch node through a second inductor.

In some embodiments, the first inductor is coupled to the first switch node through a first capacitor.

In some embodiments, a second capacitor is coupled to the junction at its first terminal and to a ground at its second terminal.

In some embodiments, a method of operating a power converter circuit is disclosed. The method includes providing a first buck converter including a first switch having a first gate terminal, a first drain terminal and a first source terminal, and a second switch having a second gate terminal, a second drain terminal and a second source terminal, the first source terminal coupled to the second drain terminal at a first switch node; providing a second buck converter including a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal; providing an input terminal coupled to the first drain terminal; providing an output terminal coupled to the first and second switch nodes; and providing a control circuit coupled to each of the first and second buck converters; continuously operating, by the control circuit, the first buck converter; sensing, by the control circuit, a voltage at the junction; comparing, by the control circuit, the sensed voltage to a first threshold voltage; disabling, by the control circuit, the second buck converter in response to the sensed voltage being at a voltage lower than the first threshold voltage; comparing, by the control circuit, the sensed voltage to a second threshold voltage; and operating, by the control circuit, the second buck converter in response to the sensed voltage being at a voltage higher than the second threshold voltage.

In some embodiments, the method further includes generating, by the first and second buck converters, an output voltage at the output terminal that is lower that an input voltage at the input terminal.

In some embodiments, the method further includes controlling power transfer, by the first and second buck converters, from the input terminal to the output terminal.

In some embodiments, a circuit is disclosed. The circuit includes a first buck converter having a first switch node; a second buck converter having a second switch node and coupled in series to the first buck converter at a junction; an input terminal coupled to first buck converter; an output terminal coupled to the first and second switch nodes; and a control circuit coupled to each of the first and second buck converters, and arranged to continuously operate the first buck converter, wherein the control circuit is further arranged to: sense a voltage at the junction; compare the sensed voltage to a first threshold voltage and in response to the sensed voltage at a voltage lower than the first threshold voltage, the control circuit disables the second buck converter; and compare the sensed voltage to a second threshold voltage and in response to the sensed voltage at a voltage higher than the second threshold voltage, the control circuit operates the second buck converter.

DETAILED DESCRIPTION

Figure 1:
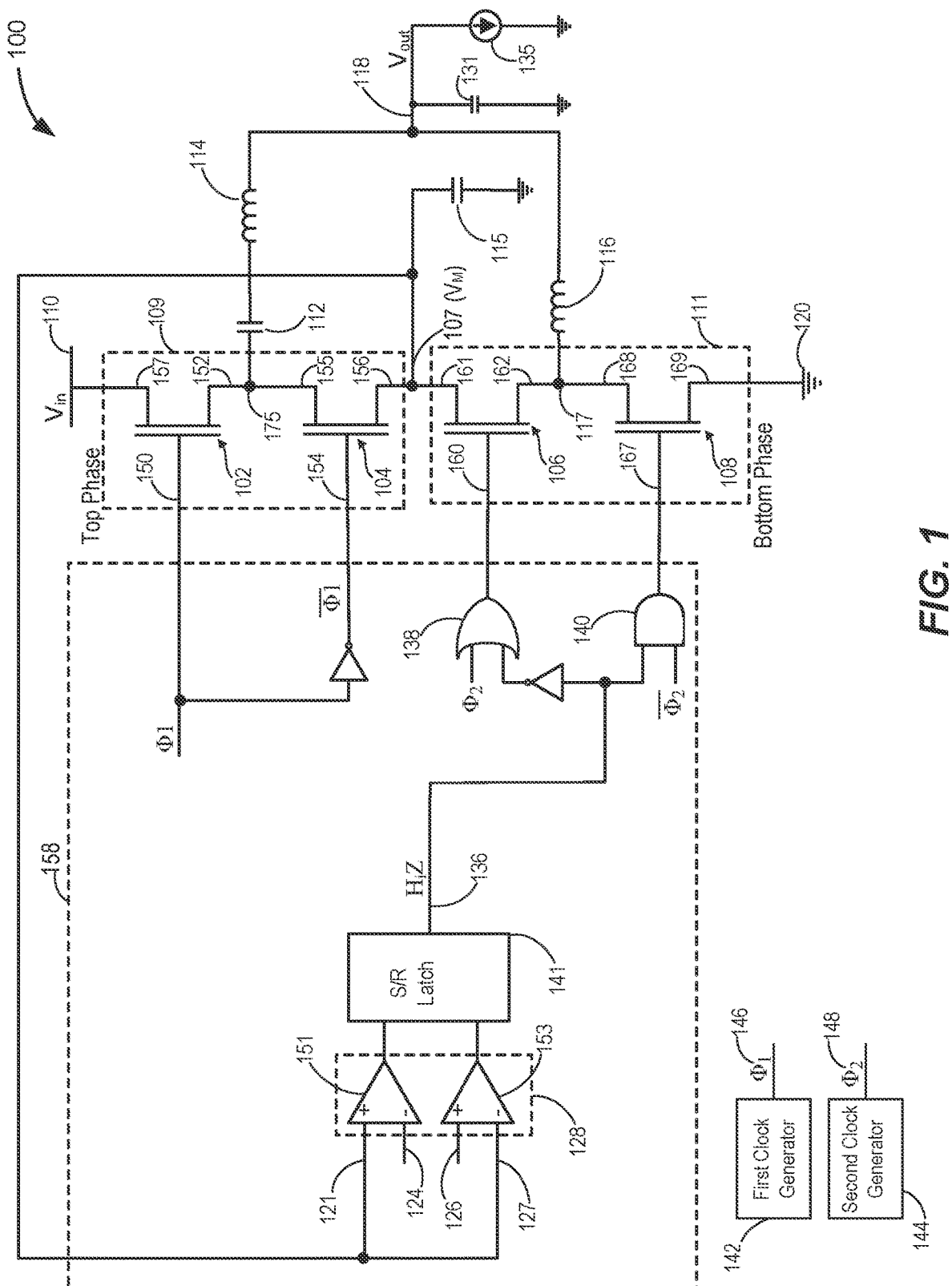
FIG. 1 illustrates a series stacked phase DC-DC power converter circuit with a stable intermediate node, according to an embodiment of the disclosure.

Circuits and related techniques disclosed herein relate generally to power converters. More specifically, circuits, devices and related techniques disclosed herein relate to systems and methods for stable intermediate node operation in series stacked phase DC-DC converters. In some embodiments, the series stacked phase DC-DC converter can include a top-phase buck converter and a bottom-phase buck converter where the bottom-phase may be turned on and off to keep an intermediate node of the series stacked phase DC-DC converter within a preset range. By keeping the intermediate node of the series stacked phase DC-DC converter within a preset range, embodiments of the present disclosure can enable elimination of a positive feedback loop that can exist in series stacked phase DC-DC converters. In this way, an interruption of the functioning of the series stacked phase DC-DC converter can be prevented, and continuous stable operation of the series stacked phase DC-DC converter can be achieved.

In various embodiments, systems and methods for stable intermediate node operation in series stacked phase DC-DC converters can eliminate the use of relatively high-voltage components in the series stacked phase DC-DC converter. More specifically, embodiments of the present disclosure can eliminate a positive feedback loop and keep the intermediate node of the series stacked phase DC-DC converter stable without using additional capacitors or power-path switches. Further, embodiments of the present disclosure can prevent an interruption of the functioning of the series stacked phase DC-DC power converter without affecting the efficiency of the power converter. In some embodiments, the series stacked phase DC-DC converter with a stable intermediate node may have an improved electromagnetic interference (EMI) spectrum. Various inventive embodiments are described herein, including methods, processes, systems, devices, and the like.

Several illustrative embodiments will now be described with respect to the accompanying drawings, which form a part hereof. The ensuing description provides embodiment (s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 illustrates a series stacked phase DC-DC power converter circuit 100 with a stable intermediate node, according to an embodiment of the disclosure. As shown in FIG. 1, the power converter circuit 100 can include a top buck converter stage 109 (top-phase), and a bottom buck converter stage 111 (bottom-phase). In the illustrated embodiment, the top-phase 109 and the bottom-phase 111 buck converter stages can be arranged in a series configuration with the top-phase 109 connected to the bottom-phase 111 at an intermediate node 107 having a voltage $V_M$. The intermediate node 107 can be coupled to a capacitor 115. Power converter circuit 100 can have an input terminal 110 arranged to receive input power ($V_{in}$).

The top-phase 109 buck converter stage can include first switch 102 having a gate terminal 150, a drain terminal 157 and a source terminal 152, and second switch 104 having a gate terminal 154, a drain terminal 155 and a source terminal 156. The first switch 102 and the second switch 104 can be coupled in series at a first switch node 175 having a voltage Vsw1. The bottom-phase 111 buck converter stage can include third switch 106 having a gate terminal 160, a drain terminal 161 and a source terminal 162, and fourth switch 108 having a gate terminal 167, a drain terminal 168 and a source terminal 169. The third switch 106 and the fourth switch 108 can be coupled in series at a second switch node 117 having a voltage Vsw2. The first switch node, 175 can be coupled to a flying capacitor 112 that is coupled to an inductor 114. The second switch node 117 can be coupled to an inductor 116. Inductors 114 and 116 can be coupled together at an output terminal 118 having an output voltage Vout. Output terminal 118 can be coupled to a capacitor 131 and a load 135. Capacitor 131 and load 135 can be coupled to a ground 120. In some embodiments, power converter circuit 100 is arranged to deliver an output voltage Vout at the output terminal 118 that is lower than an input voltage $V_{in}$ at the input terminal 110.

The power converter circuit 100 can include a logic and control circuit 158 that is coupled to the top-phase 109 and to the bottom-phase 111. The logic and control circuit 158 may be arranged to generate control signals that control operation of the top-phase 109 and bottom-phase 111 buck converter stages such as to control to delivery of power form the input terminal 110 to the output terminal 118. In some embodiments, the bottom-phase 111 can be turned on and off alternatively by the logic and control circuit 158 while the top-phase 109 continues to run. In one embodiment, the logic and control circuit 158 can include a window comparator 128 and a set-reset (S/R) latch 141. The window comparator 128 can sense the voltage $V_M$ at the intermediate node 107 and compare it to a preset threshold value, and keep the voltage $V_M$ within a preset window, for example, within 100 mV below and 10 mV above an ideal value for $V_M$. As appreciated by one of ordinary skill in the art having the benefit of this disclosure, the value of the preset window can be set to any suitable value. In some embodiments, an ideal value for $V_M$ would be $V_{in}/2$.

The window comparator 128 can include a first comparator 151 and a second comparator 153. The outputs of the first comparator 151 and the second comparator 153 can toggle the S/R latch 141, that in turn can alternatively enable/disable the operation of the bottom-phase 111. A first input 121 of the first comparator 151 can be connected to the intermediate node 107. The second input 124 of the first comparator 151 can be connected to a first reference voltage that may be set to a preset threshold value, for example, a value equal to an ideal value of the voltage $V_M$ plus 10 mV. A first input 127 of the second comparator 153 can be connected to intermediate node 107. The second input 126 of the second comparator 153 can be connected to a second reference voltage that is set to a preset threshold value, for example, a value equal to an ideal value of $V_M$ minus 100 mV. In this way, intermediate node 107 can be kept within a preset window, for example, within 100 mV below and 10 mV above an ideal of $V_M$. In various embodiments, the first comparator 151 can have a hysteresis threshold value of that is the same value as the preset threshold value above the ideal value for $V_M$. As appreciated by one of ordinary skill in the art having the benefit of this disclosure, the first and second reference voltages can be set to any suitable value.

When the intermediate node 107 rises above the preset threshold value, for example above 10 mV over $V_{in}/2$, the bottom-phase 111 can turn on and start switching until the intermediate node 107 ($V_M$) falls below the preset threshold value, for example 100 mV below $V_{in}/2$, at which time the bottom-phase is turned off. In this way, the intermediate node 107 ($V_M$) may not fall below the preset threshold value. This can prevent positive feedback from developing and disrupting the operation of the power converter circuit. The top-phase 109 can continue to switch continuously while the bottom-phase 111 is being turned on and off alternatively. Although one specific embodiment of a window comparator circuit is discussed above, one of skill in the art having the benefit of this disclosure will appreciate that the intermediate node 107 ($V_M$) may be monitored directly, or a filtered version of the intermediate node 107 ($V_M$) may be monitored, or a digital filter may be applied to an output of the comparator, all of which are within the scope of identifying a degrading intermediate node voltage without erroneously triggering the comparator due to noise.

The S/R latch 141 can produce a signal HiZ at node 136. Signal HiZ can enable/disable the operation of the bottom-phase 111. The power converter circuit 100 can include a first clock generator 142 that can generate first clock $\Phi_1$ 146, and a second clock generator 144 that can generate second clock $\Phi_2$ 148. The first clock 146 can be applied to the gate terminal 150 of first switch 102, and the inverse of the first clock 146 can be applied to the gate terminal 154 of second switch 104. The second clock 148 can be applied to the gate terminal 160 of third switch 106 through an OR gate 138, and the inverse of the second clock 148 can be applied to the gate terminal 167 of fourth switch 108 through an AND gate 140. Although one specific control circuit and algorithm are discussed above, one of skill in the art having the benefit of this disclosure will appreciate that other control circuit architectures and control algorithms can be used for the series stacked phase DC-DC power converter circuit 100 and are within the scope of this disclosure.

Figure 2:
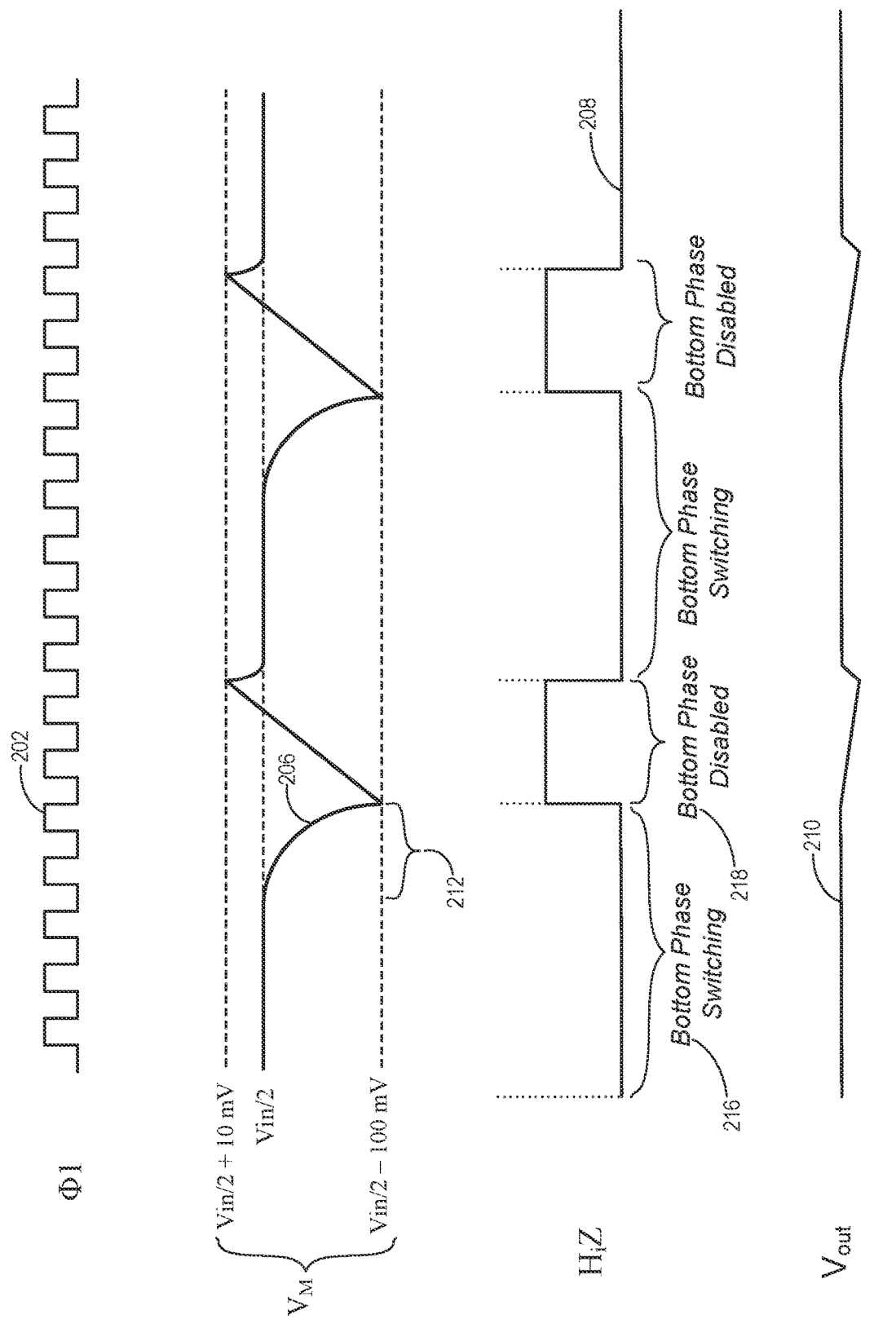
FIG. 2 illustrates a switching sequence and timing diagram for the DC-DC power converter circuit of FIG. 1.

Now referring simultaneously to FIGS. 1 and 2, an embodiment of a switching sequence and timing diagrams for circuit 100 are illustrated. FIG. 2 illustrates waveforms for the signal on the gate of the first switch 102 ($\Phi_1$), the signal on the intermediate node 107 ($V_M$), the signal HiZ at node 136 and the output voltage ($V_{out}$) at the output terminal 118. During a first time period 216, where in diagram 208 the bottom-phase 111 is switching, the signal HiZ is low, thus bottom-phase 111 is enabled and can switch, while the top-phase 109 can be switching simultaneously, as shown in diagram 202 where the clock $\Phi_1$ at the gate of first switch 102 is switching. During the first time period 216, the voltage at the intermediate node 107 ($V_M$) is steady and then decreases rapidly during the time period 212 due to onset of the positive feedback effect. During the time period 212, $V_M$ continues to decrease until it reaches 100 mV below $V_{in}/2$, as shown in diagram 206. Then the window comparator 128 toggles the S/R latch 141. This results in ending the "bottom phase switching" period and a second time period 218 starts where the bottom-phase 111 is disabled.

During the second time period 218, where the bottom-phase 111 is disabled, the signal HiZ is high, thus the bottom-phase 111 is disabled, while the top-phase 109 continues to switch. During the second time period 218, $V_M$ can start to recover and increase in value. $V_M$ continues to increase during the second time period 218 until it reaches 10 mV above $V_{in}/2$. Then the window comparator 128 toggles the S/R latch 141. This results in ending the second period and starts a new "bottom phase switching" period. As appreciated by one of ordinary skill in the art having the benefit of this disclosure, an acceptable value for voltage fluctuations on the intermediate node 107 ($V_M$) can be set based on the power converter specifications. Diagram 210 shows the voltage at the output terminal 118 ($V_{OUT}$). As can be seen in diagram 210, $V_{OUT}$ regulates during the first time period 216. During the second time period 218, while the top-phase is switching and the bottom-phase is disabled, $V_{OUT}$ may not be able to regulate within the set points. However, this condition may be acceptable since the converter can be overloaded beyond its normally specified operating parameters.

As appreciated by one of ordinary skill in the art having the benefit of this disclosure, the disclosed on/off switching technique for the bottom-phase is one technique for reducing the current draw from the intermediate node thus preventing its degradation. Other techniques may be utilized, for example, blanking switching cycles (so that the bottom-phase switches only, for example, every-other cycle), or forcing the duty cycle of the bottom-phase to pull less current from the intermediate node resulting in lower high-side on time. Further, one of ordinary skill in the art having the benefit of this disclosure will recognize that other techniques for monitoring of the intermediate node, and more than one set of comparator thresholds can be used, for example, a 'soft response' may be utilized to recover minor degradation in $V_M$ voltage, while a 'hard response' may be employed for more significant $V_M$ degradations.

As appreciated by one of ordinary skill in the art having the benefit of this disclosure, other feedback loops based on voltages and/or currents at other nodes within the series stacked phase DC-DC power converter circuit 100 can be utilized for monitoring of the intermediate node. It will be understood by one of ordinary skill in the art that there can be alternative methods of controlling the switches in circuit 100 in such a way as to achieve overall loop control, and such methods are within the scope of this disclosure. It will be further understood by one of ordinary skill in the art that alternate methods of controlling the switches in circuit 100 can be utilized in order to optimize light load efficiency, or to minimize area, and/or to minimize electromagnetic interference (EMI), and such methods are within the scope of this disclosure.

Although system and methods for stable intermediate node operation in series stacked phase DC-DC converters are described and illustrated herein with respect to one particular configuration of series stacked phase DC-DC power converter circuits, embodiments of the disclosure are suitable for use with other configurations of DC-DC power converters. For example, multi-phase DC-DC power converter circuits can employ embodiments of the disclosure to alternatively switch phases in order to operate more efficiently.

In some embodiments, the described switches can be formed in silicon, or any other suitable semiconductor material. In various embodiments, the described switches can be transistors. In some embodiments, the described switches can be metal oxide semiconductor field effect transistors (MOSFETs). In various embodiments, the disclosed MOSFETS can all be formed within one single die well. In some embodiments, the disclosed series stacked phase DC-DC power converter circuits (including the transistors and the control circuitry) can be monolithically integrated onto a single die. In various embodiments, top-phase and bottom-phase stages can be formed on separate individual die. In some embodiments, top-phase, bottom-phase and the logic and control circuits and any combination of them can be formed in groups on separate die, for example, top-phase and bottom-phase can be formed on a single die and the logic and control circuits may be formed on a separate die, or top-phase and bottom-phase can be formed on the same die as the logic and control circuits. In various embodiments, top-phase, bottom-phase and the logic and control circuits can all be integrated into one electronic package, for example, but not limited to, into a quad-flat no-lead (QFN) package, or into a dual-flat no-leads (DFN) package, into a ball grid array (BGA) package. In some embodiments, top-phase and bottom-phase can be individually packaged into an electronic package. In various embodiments, controller circuits and/or control logic circuits can be integrated into a single die along with the disclosed series stacked phase DC-DC converter.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A power converter circuit comprising:
a first buck converter including a first switch having a first gate terminal, a first drain terminal and a first source terminal, and a second switch having a second gate terminal, a second drain terminal and a second source terminal, the first source terminal coupled to the second drain terminal at a first switch node;
a second buck converter including a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal;
an input terminal coupled to the first drain terminal;
an output terminal coupled to the first and second switch nodes; and
a control circuit coupled to each of the first and second buck converters, and arranged to continuously operate the first buck converter, wherein the control circuit is further arranged to:
sense a voltage at the junction;
compare the sensed voltage to a first threshold voltage and in response to the sensed voltage being at a voltage lower than the first threshold voltage, the control circuit disables the second buck converter; and
compare the sensed voltage to a second threshold voltage and in response to the sensed voltage being at a voltage higher than the second threshold voltage, the control circuit operates the second buck converter.

2. The power converter circuit of claim 1, wherein the first and second buck converters are arranged to generate an output voltage at the output terminal that is lower than an input voltage at the input terminal.

3. The power converter circuit of claim 1, wherein the first and second buck converters are arranged to control power transfer from the input terminal to the output terminal.

4. The power converter circuit of claim 1, wherein the control circuit comprises a window comparator that includes a first comparator and a second comparator.

5. The power converter circuit of claim 4, wherein the first comparator is arranged to receive the voltage at the junction and to receive the first threshold voltage.

6. The power converter circuit of claim 5, wherein the second comparator is arranged to receive the voltage at the junction and to receive the second threshold voltage.

7. The power converter circuit of claim 5, wherein the output terminal is coupled to the first switch node through a first inductor.

8. The power converter circuit of claim 7, wherein the first inductor is coupled to the first switch node through a first capacitor.

9. The power converter circuit of claim 8, wherein a second capacitor is coupled to the junction at its first terminal and to a ground at its second terminal.

10. The power converter circuit of claim 5, wherein the output terminal is coupled to the second switch node through a second inductor.

11. A method of operating a power converter circuit, the method including:
providing a first buck converter including a first switch having a first gate terminal, a first drain terminal and a first source terminal, and a second switch having a second gate terminal, a second drain terminal and a second source terminal, the first source terminal coupled to the second drain terminal at a first switch node;
providing a second buck converter including a third switch having a third gate terminal, a third drain terminal and a third source terminal, and a fourth switch having a fourth gate terminal, a fourth drain terminal and a fourth source terminal, the third source terminal coupled to the fourth drain terminal at a second switch node, wherein the second buck converter is coupled in series to the first buck converter at a junction such that the third drain terminal is coupled to the second source terminal;
providing an input terminal coupled to the first drain terminal;
providing an output terminal coupled to the first and second switch nodes; and
providing a control circuit coupled to each of the first and second buck converters;
continuously operating, by the control circuit, the first buck converter;
sensing, by the control circuit, a voltage at the junction;
comparing, by the control circuit, the sensed voltage to a first threshold voltage;
disabling, by the control circuit, the second buck converter in response to the sensed voltage being at a voltage lower than the first threshold voltage;
comparing, by the control circuit, the sensed voltage to a second threshold voltage; and
operating, by the control circuit, the second buck converter in response to the sensed voltage being at a voltage higher than the second threshold voltage.

12. The method of claim 11, further comprising generating, by the first and second buck converters, an output voltage at the output terminal that is lower than an input voltage at the input terminal.

13. The method of claim 11, further comprising controlling power transfer, by the first and second buck converters, from the input terminal to the output terminal.

14. The method of claim 11, wherein the control circuit comprises a window comparator that includes a first comparator and a second comparator.

15. The method of claim 14, wherein the first comparator is arranged to receive the voltage at the junction and to receive the first threshold voltage.

16. The method of claim 15, wherein the second comparator is arranged to receive the voltage at the junction and to receive the second threshold voltage.

17. A circuit comprising:
a first buck converter having a first switch node;
a second buck converter having a second switch node and coupled in series to the first buck converter at a junction;
an input terminal coupled to the first buck converter;
an output terminal coupled to the first and second switch nodes; and
a control circuit coupled to each of the first and second buck converters, and arranged to continuously operate the first buck converter, wherein the control circuit is further arranged to:
sense a voltage at the junction;
compare the sensed voltage to a first threshold voltage and in response to the sensed voltage being at a voltage lower than the first threshold voltage, disables the second buck converter; and
compare the sensed voltage to a second threshold voltage and in response to the sensed voltage being at a voltage higher than the second threshold voltage, the control circuit operates the second buck converter.

18. The circuit of claim 17, wherein the first and second buck converters are arranged to generate an output voltage at the output terminal that is lower than an input voltage at the input terminal.

19. The circuit of claim 17, wherein the first and second buck converters are arranged to control power transfer from the input terminal to the output terminal.

20. The circuit of claim 17, wherein the control circuit comprises a window comparator that includes a first comparator and a second comparator.

\* \* \* \* \*